(12) United States Patent
Kalouche

(10) Patent No.: US 12,257,699 B2
(45) Date of Patent: Mar. 25, 2025

(54) END EFFECTOR FOR ROBOTIC PICKING AND PACKING

(71) Applicant: Nimble Robotics, Inc., San Francisco, CA (US)

(72) Inventor: Simon Kalouche, San Francisco, CA (US)

(73) Assignee: Nimble Robotics, Inc., San Francisco, CA (US)

( * ) Notice: Subject to any disclaimer, the term of this patent is extended or adjusted under 35 U.S.C. 154(b) by 763 days.

(21) Appl. No.: 17/546,680

(22) Filed: Dec. 9, 2021

(65) Prior Publication Data

US 2023/0067742 A1 Mar. 2, 2023

Related U.S. Application Data

(60) Provisional application No. 63/237,772, filed on Aug. 27, 2021.

(51) Int. Cl.
*B25J 15/10* (2006.01)
*B25J 15/00* (2006.01)
*B25J 15/06* (2006.01)

(52) U.S. Cl.
CPC .......... *B25J 15/10* (2013.01); *B25J 15/0033* (2013.01); *B25J 15/0666* (2013.01)

(58) Field of Classification Search
CPC .... B25J 15/10; B25J 15/0666; B25J 15/0033; B66C 1/44
USPC ........................................ 294/106, 183, 213
See application file for complete search history.

(56) References Cited

U.S. PATENT DOCUMENTS

| 4,108,485 A | * | 8/1978 | Jennings | B66C 1/66 |
| | | | | 294/67.31 |
| 4,437,232 A | * | 3/1984 | Araki | H05K 13/0419 |
| | | | | 294/106 |
| 4,610,473 A | | 9/1986 | Hawkswell | |
| 4,627,785 A | * | 12/1986 | Monforte | B25J 15/0616 |
| | | | | 414/730 |
| 5,863,086 A | * | 1/1999 | Christenson | B65F 3/04 |
| | | | | 294/902 |

(Continued)

FOREIGN PATENT DOCUMENTS

| CA | 3033124 A1 | 11/2018 |
| JP | H02 59248 A | 2/1990 |

(Continued)

OTHER PUBLICATIONS

International Search Report and Written Opinion issued in Appln. No. PCT/US2022/040844 mailed Dec. 2, 2022 (16 pages).

(Continued)

*Primary Examiner* — Paul T Chin
(74) *Attorney, Agent, or Firm* — POLSINELLI PC

(57) ABSTRACT

A robotic end effector tool having multiple manipulator elements. The end effector includes a body, a suction cup movable relative to the body between a retracted position and an extended position, a plurality of fingers spaced around the suction cup and being actuatable between an open condition and a clamped condition, and a roller coupled to at least one of the fingers such that the roller is arranged to rotate about a first axis. The combination of the suction cup, the fingers and the rollers are arranged to pick an item and adjust the orientation of an object without setting the object down.

20 Claims, 5 Drawing Sheets

(56) References Cited

U.S. PATENT DOCUMENTS

| | | |
|---|---|---|
| 2012/0059517 A1 | 3/2012 | Nomura |
| 2017/0181341 A1 | 6/2017 | Yamamoto |
| 2019/0168396 A1 | 6/2019 | Leidenfrost |
| 2020/0078939 A1* | 3/2020 | Jeong .................... B25J 9/1697 |
| 2021/0032034 A1 | 2/2021 | Kalouche |
| 2021/0268658 A1 | 9/2021 | Kalouche et al. |

FOREIGN PATENT DOCUMENTS

| | | |
|---|---|---|
| JP | 6578509 B2 | 9/2019 |
| WO | 2020072813 A1 | 4/2020 |
| WO | 2020/194393 A1 | 10/2020 |

OTHER PUBLICATIONS

Yuan, et al., "Design and Control of Roller Grasper V2 for In-Hand Manipulation" IEEE/RSJ International Conference on Intelligent Robots and Systems (IROS) 2020. 8 pgs.

"Learn Dexterous Manipulation on a Real Robot" [online] [retrieved Dec. 10, 2021]. Retrieved from the Internet: <https://real-robot-challenge.com/> 2 pgs.

Yuan, et al., "Roller Grasper V2" [online] [retrieved Dec. 10, 2021]. Retrieved from the Internet: <https://yuanshenli.com/roller_grasper_v2.html> 2 pgs.

* cited by examiner

END EFFECTOR FOR ROBOTIC PICKING AND PACKING

CROSS-REFERENCE TO RELATED APPLICATIONS

This application claims the benefit of the filing date of U.S. Provisional Patent Application No. 63/237,772 filed Aug. 27, 2021, the disclosure of which is hereby incorporated herein by reference.

BACKGROUND

The present disclosure relates generally to robotic end effector tools, and more particularly, to robotic end effector tools having multiple manipulator elements on a single tool for improved item handling.

Order fulfillment is the operation in which orders are processed, picked from storage systems, packed, and shipped to the customer. To reduce delivery times, some fulfillment centers rely on autonomous robots to complete one or more order fulfillment tasks.

Despite the recent improvements to order fulfillment robots, drawbacks remain. For example, these robots are not currently adept at autonomously completing tasks that require substantial variation such as the picking and packing of millions of different items that vary in size, dimension, shape, weight and stiffness. Put simply, there is not a single conventional robotic end effector tool that can successfully pick (e.g., securely grasp and retrieve an item from a picking location) a wide variety of item types. Furthermore, even if an end effector can successfully pick one item type using a particular pose (e.g., the orientation of the end effector relative to the item) that particular pose may not be conducive for packing the grasped item in a specific location within an order container. Put differently, picking an item from a picking location may require a first pose and packing the item at a particular location within an order container may require the object be oriented differently. Conventional end effectors, however, are generally incapable of adjusting the pose of an item while the item is securely held. In this regard, to adjust the pose of a picked item in preparation of packing that item, the robot must first drop the item back into the picking location, or onto an intermediate manipulation surface, before the item is again grasped and held in a different pose that is more conducive to packing to the item. Releasing and re-grasping the item is time consuming and reduces pick and pack efficiency.

In summary, there is not a single conventional end effector that can optimally pick and pack a large variety of inventory items.

BRIEF SUMMARY

In accordance with a first aspect of the present disclosure, a robotic end effector tool having multiple manipulator elements on a single gripping tool is provided. Among other advantages, the manipulator elements allow the robot to adjust its manipulation pose without fully releasing a grasped object. In this regard, the robot can easily and efficiently change the orientation of the object relative to the end effector when desired, for example, to better secure a grasped item to prevent it from falling out of the grasp of the robot and/or in preparation of packing the item at a specific location and/or in a specific orientation within an order container.

In a first aspect, a robotic end effector tool is provided and the robotic end effector includes a body, a suction cup movable relative to the body between a retracted position and an extended position, a plurality of fingers spaced around the suction cup with each finger being actuatable between an open condition and a clamped condition, and a roller coupled to at least one of the fingers such that the roller rotatable about a first axis.

In another aspect, a method of repositioning an object relative to a palm of a robotic end effector tool is provided, and the method includes: securing the object between a plurality of rollers, each roller being coupled to a respective finger of the robotic end effector tool; releasing the object from a suction cup after the securing step; and rotating the rollers, after the releasing step, to rotate the object relative to the palm of the robotic end effector tool.

In a further aspect, a robot is provided and the robot has a robot arm equipped with an end effector, including: body, a suction cup movable relative to the body between a retracted position and an extended position; a plurality of fingers spaced about the suction cup with each of the fingers being actuatable between an open condition and a clamped condition, and a roller coupled to each one of the plurality of fingers and arranged to rotate about first and second axes.

In yet another aspect, a picking station includes a pedestal to which the robot is mounted.

DETAILED DESCRIPTION

The technology disclosed herein relates to robotic end effector tools having various manipulator elements on a single tool for improved item handling. As used herein, the term "tool" means a device that is either affixed or couplable to a manipulator (or is a stand-alone manipulator) and designed to perform a fulfillment task such as grasping items, manipulating items, packing items, etc. In contrast, the term "element" denotes particular features of the tool as a whole, designed to individually or in combination with other elements of the tool, perform a fulfillment task such as manipulating an item. Also as used herein, the terms "substantially," "generally," and "about" are intended to mean that slight deviations from absolute are included within the scope of the term so modified.

Figure 1A:
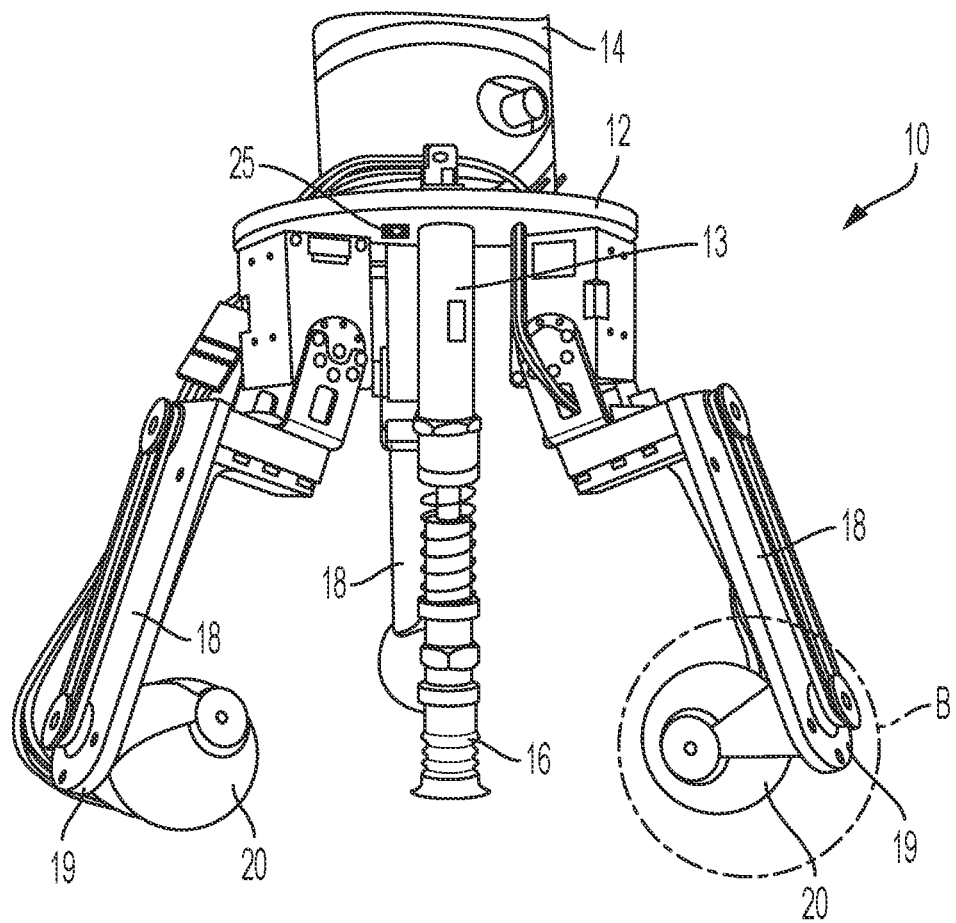
FIG. 1A is a side elevation view of a robotic end effector tool including a suction cup and a plurality of fingers each of which is provided with a respective roller according to an embodiment of the present disclosure.
Figure 1B:
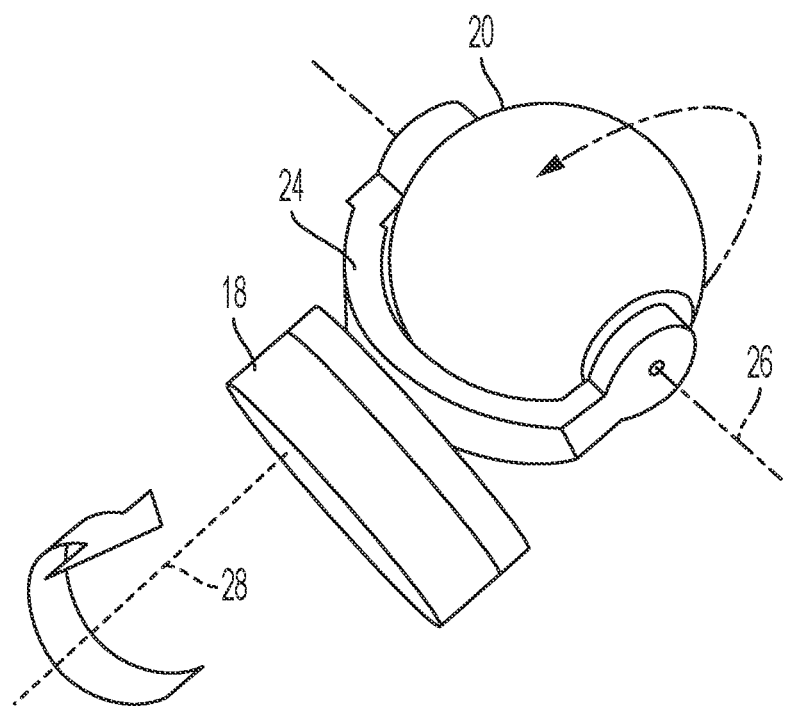
FIG. 1B is an enlarged perspective view of area B of the robotic end effector tool of FIG. 1A showing the connection between one of the rollers and its respective finger.
Figure 2:
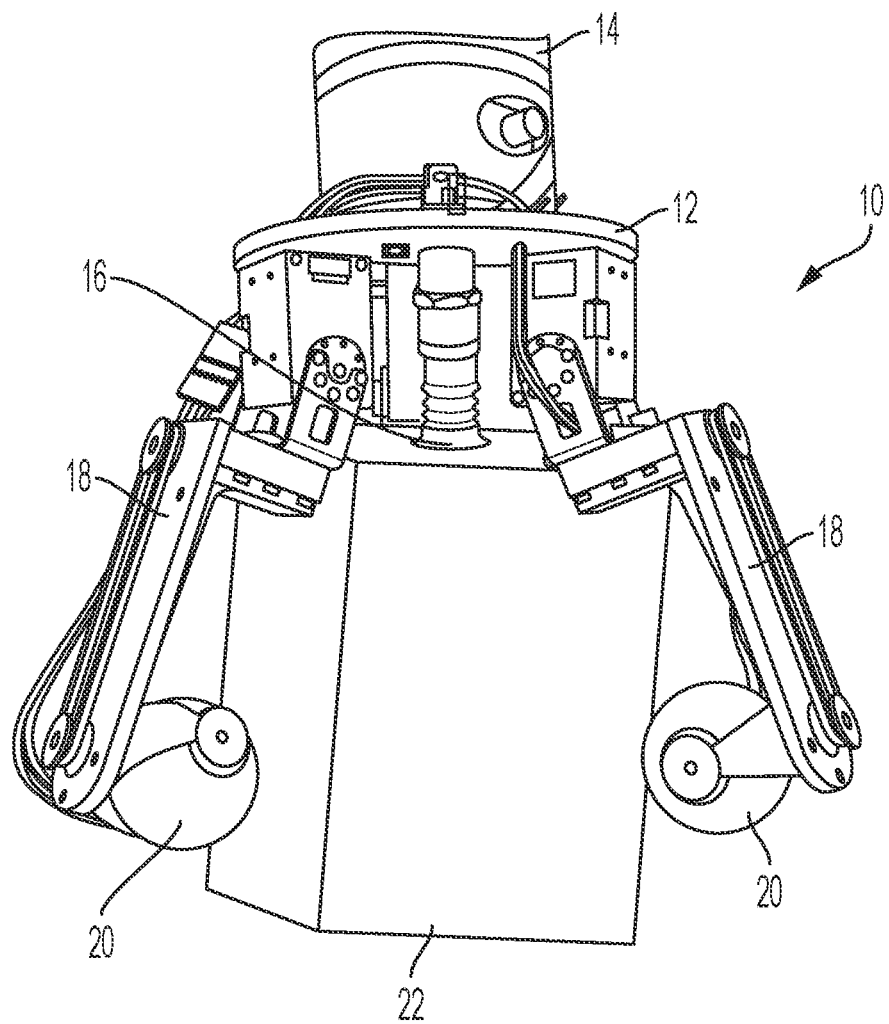
FIG. 2 is a side elevation view illustrating an item being grasped by the robotic end effector tool of FIG. 1A.

Referring to FIGS. 1A, 1B, and 2, robotic end effector tool 10 includes a body 12 with an attachment connection configured to be secured to a robot arm 14, a suction cup 16 attached to the body, a plurality of fingers 18 annularly spaced about the suction cup and actuatable between an open and ready-to-grasp condition and a clamped condition, and a roller 20 coupled each one of the fingers. End effector 10 is an exemplary "tool" while suction cup 16, each finger 18 and each roller 20 are "elements" of the tool.

Suction cup 16 is moveable relative to the body 12 of end effector 10. For example, suction cup 16 may be coupled to the body 12 by a connector 13 that is extendable out from robotic arm 14 (as shown in FIG. 1) and retractable into the robotic arm (as shown in FIG. 2) which, in turn, moves the suction cup from an extended position to a retracted position. In some aspects, suction cup 16 may also be pivotable about a connection point at which the suction cup is attached to connector 13.

Each one of fingers 18 is coupled to body 12 in a manner that allows the fingers to move between the open condition and the clamped condition to securely grasp and release an object 22. Fingers 18 may be formed from a rigid material or a compliant material that passively conforms to an object when grasped by the fingers. A single actuator may be used to simultaneously actuate all of the fingers or multiple actuators may be used to selectively actuate one or more of the finger at a time. In a preferred embodiment, the actuator(s) may be pneumatically or electrically controlled. For example, fingers 18 may include a single pneumatic actuator designed to simultaneously open and close the fingers relative to the palm such that the fingers cooperate with one another to securely grasp and release object 22. Alternatively, when multiple pneumatic or electrical actuators are utilized, fingers 18 are independently movable toward and away from the palm. In some embodiments, additional suction cups (not shown) may be disposed at the tips 19 of fingers 18 and can be used to grasp a single item in multiple locations or to pick multiple items at once. When end effector 10 includes the additional suction cups, suction cup 16 and each additional suction cup may be in fluid communication with a pneumatic source via a respective fluid line that is independent and discrete from the fluid lines of the other suction cups. In this regard, suction cup 16 and each of the additional suction cup may be individually actuated.

Rollers 20 may be placed at any location along a length of fingers 18 including, for example, at a location adjacent the tips 19 of the fingers as shown in FIGS. 1A, 1B, and 2. Rollers 20 may be electrically or pneumatically controlled and driven by a transmission or via a direct drive. Each roller 20 is rotatable about at least two axes, and relative to a respective finger 18, which assists end effector 10 in rotating object 22 in any direction. That is, the rollers 20 of any two or more fingers 18 can rotate with respect to one another to apply rolling forces on a held object 22 to rotate the object in any desired direction.

With specific reference to FIG. 1B, an example arrangement providing rollers 20 with two rotational degrees of freedom relative to finger 18 is provided: (1) a first rotational degree of freedom about first axis 26; and (2) a second rotational degree of freedom about a second axis 28 transverse to the first axis. As shown in FIG. 1B, a substantially U-shaped bracket 24 is located at or near the tip 19 of finger 18 to retains roller 20 in a manner that permits the roller to rotate about first axis 26 and relative to finger 18. Bracket 24 is rotatable about second axis 28 relative to finger 18. Because bracket 24 retains roller 20, rotation of the bracket about second axis 28 will, in turn, also cause the roller 20 to rotate about second axis 28. The collective rotation of roller 20 about first axis 26 and bracket 24 about second axis 28 allows end effector 10 to rotate object 22 in any direction relative to finger 18. In this regard, when rollers 20 are engaged with object 22, the object may be rotationally manipulated in any direction relative to the palm of body 12. In one example, manipulation of the object can include synchronous motion of fingers 18 and rollers 20, usually while at least two rollers 20 remain in contact with the object, to angularly reposition the object relative to the palm of the body 12. One or more rotary encoders may be located at the interface between roller 20 and bracket 24 to measure and control the rotation of the roller about first axis 26 and at the interface between bracket 24 and finger 18 to measure and control rotation of the bracket about second axis 28.

In a preferred embodiment, end effector 10 may include a controller configured to measure feedback from fingers 18 and/or rollers 20 to assist a processor in determining the properties of an object secured by the end effector, for example, the weight, resilience, and texture of the object. This information can be relayed to a processor to determine which one or more manipulator element(s) should be used to secure the object and/or the suction or gripping force that should be applied to secure the object. Force transparent or back drivable mechanics may be employed between rollers 20 and the controller through fingers 18 to facilitate such feedback. Such feedback may additionally be used to calculate the load of an object secured to end effector 10.

The properties or pose of a given object may additionally, or alternatively, be captured by a camera 25 or other imaging sensor (hereinafter "camera") configured to capture pictures, point clouds, video etc. (hereinafter "image data"). In one example, camera 25 may be embedded within or otherwise coupled to the palm of the body 12 of end effector 10 and oriented to capture image data from an object prior to and while the object is secured to the end effector. Suction through suction cup 16 may cease after fingers 18 have grasped the object and suction cup 16 may be retracted at least partially to provide some clearance for movement of the object as it is manipulated by fingers 18 and rollers.

The entire end effector 10 tool and/or its individual elements, such as suction cup 16 and/or the additional suction cups, can be swapped or exchanged for other end effector tools or other elements via a magnetic or mechanical connection in a manner similar the "tool swapping" mechanism described in U.S. Pat. Pub. No. 2021/0032034 assigned to Applicant and hereby incorporated herein by reference in its entirety. Example mechanical connections between the interface of robotic arm 14 and end effector 10 and/or the interface between the body 12 and any of the individual elements of the end effector may be a snap-fit, twist-lock, quick-connect, or any other connection that allows the tool to be autonomously disconnected and swapped (e.g., replaced) for another tool and/or that allows individual elements to be autonomously disconnected and/or swapped with manipulator elements of other sizes, shapes, configurations and/or types.

In use, end effector 10 is arranged to pick an item from a picking location using suction cup 16 (via suction) and/or fingers 18 (via clamping) and to secure the item to the end effector. If the robot desires to adjust the manipulation pose (e.g., the orientation of the grasped item relative to the palm of body 12), end effector 10 will clamp object 22 between the rollers 20 and/or fingers 18 and turn off the suction force supplied to suction cup 16 before the suction cup is retracted away from the object. Two or more rollers 20 may then be rotated about first axis 26 and/or second axis 28 to spin the grasped object 22 within a desired plane. This process can be repeated until the object 22 is oriented as desired. With the object 22 in a desired orientation, suction cup 16 and/or fingers 18 may optionally reengage the object to further secure the item to end effector 10 before the manipulation task is completed, for example, before the object is packed in the desired location within an order container.

Figure 3:
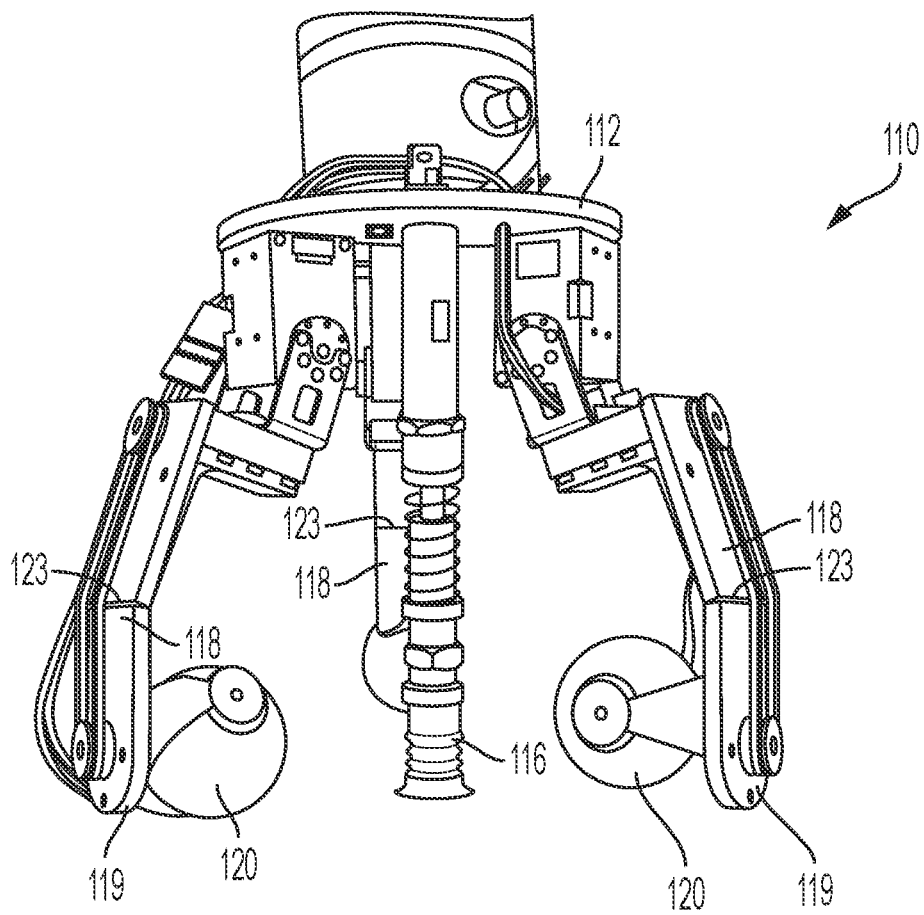
FIG. 3 is a perspective view of a robotic end effector tool according to another embodiment of the present disclosure.

FIG. 3 illustrates a variant end effector 110 that is generally similar to end effector 10. Variant end effector includes a body 112 having multiple elements such as a suction cup 116, fingers 118, and rollers 120 for manipulating an object. Variant end effector 110 only differs from end effector 10 in that each finger 118 include a joint 123 dividing the finger into a proximal section and a distal section. The proximal section extends between a base 121 of finger 118 and the joint 123 of the finger. On the other hand, the distal section extends between the joint 123 of finger 118 and the tip 119 of the finger. Each joint 123 may be constructed so as to provide the distal portion, to which roller 120 is mounted, with one, two, or three degrees of freedom relative to the respective proximal portion of finger 118. Each joint 119 may optionally include a multi-axis rotary encoder or a number of rotary encoders equal to the number of degrees of freedom provided by the joint 119 to monitor feedback received from the joint and to control movement of the joint by a controller in a manner similar to that explained above with respect to the controller of end effector 10. Variant end effector 110 may be used and controlled in a substantially similar manner to end effectors 10 and, therefore, such use and control is not explained again in detail herein. The only difference being that the controller of variant end effector 110 may additionally be used to obtain feedback and control movement of fingers 118 in addition to the other controllable features mentioned above with respect to end effectors.

Either of the above described end effectors 10, 100 may be attached to an arm of a pick and place robot, such as a pick and place robot mounted to a stationary pedestal within a picking station as described in U.S. Pat. Pub. No. 2021/0268658 assigned to Applicant and hereby incorporated herein by reference in its entirety. Alternatively, end effectors 10, 100 may be attached to a mobile manipulator robot for navigating and retrieving goods from a grid-based three-dimensional storage system such as that as described in U.S. Pat. Pub. No. 2021/0032034 also assigned to Applicant and hereby incorporated herein by reference in its entirety.

Figure 4:
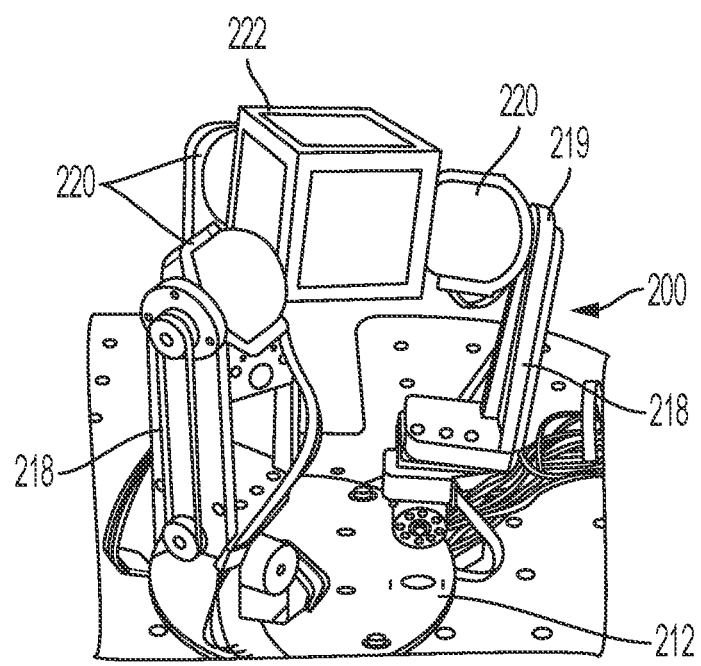
FIG. 4 is a perspective view of a robotic end effector tool according to yet another embodiment of the present disclosure.

FIG. 4 illustrates a manipulator tool designed to angularly reposition an object that was previously picked by an end effector. Manipulator tool 200 is similar to end effector 10 in that manipulator tool 200 includes fingers 218 and rollers 220 that are similarly constructed to the fingers 18 and the roller 20 of end effector 10. Manipulator tool 200, however, differs from end effector 10 in the following ways. First, manipulator tool 200 need not include an attachment area for connection to a robot arm. Instead, manipulator tool 200 may be placed on a surface adjacent to a picking location and operate primarily to angularly orient an object picked by an end effector. Secondly, when placed on a surface, manipulator tool 200 is inverted relative to end effector 10 (e.g., the palm of body 212 and the tips 219 of fingers 218 point generally upward). Thirdly, manipulator tool 200 may or may not include a suction cup. Because manipulator tool 200 is inverted, it will be appreciated that the manipulator tool is not configured to pick an item from a picking location such a source container or tote. Instead, in use, end effector 10, variant end effector 110, or any other end effector, could be used grasp an item from a picking location, hand the grasped item to manipulator tool 200, which would then be tasked with reorienting the object before the object is handed back to the original end effector (or another end effector) to complete the fulfillment task.

Although the concepts herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A robotic end effector tool, comprising:
   a body;
   a suction cup movable relative to the body between a retracted position and an extended position;
   a plurality of fingers spaced around the suction cup, the plurality of fingers being actuatable between an open condition and a clamped condition; and
   a roller coupled to at least one of the fingers, the roller being rotatable about a first axis.

2. The robotic end effector tool of claim 1, wherein the roller is rotatable about a second axis transverse to first axis.

3. The robotic end effector tool of claim 2, further comprising a bracket coupling the roller to the at least one of the fingers, wherein the roller is rotatable within and relative to the bracket about the first axis.

4. The robotic end effector tool of claim 3, wherein the bracket is rotatable relative to the at least one of the fingers about the second axis.

5. The robotic end effector tool of claim 1, further comprising a connector coupling the suction cup to the body, the connector being retractable and extendable to move the suction cup between the retracted position and the extended position.

6. The robotic end effector tool of claim 1, wherein the plurality of fingers comprises three fingers.

7. The robotic end effector tool of claim 1, further comprising a camera to capture image data.

8. The robotic end effector tool of claim 1, wherein the body includes an attachment device arranged to removably secure the body to a robotic arm of a robot.

9. The robotic end effector tool of claim 1, wherein the roller is spherical.

10. A method of repositioning an object relative to a palm of a robotic end effector tool, the method comprising:
    securing the object between a plurality of rollers, each roller being coupled to a respective finger of the robotic end effector tool;
    releasing the object from a suction cup after the securing step; and
    rotating the rollers, after the releasing step, to rotate the object relative to the palm of the robotic end effector tool.

11. The method of claim 10, wherein the rotating step includes rotating the rollers about two axes.

12. The method of claim 10, further comprising:
    extending the suction cup away from the palm of the end effector; and
    applying a suction force to grasp the object,
    wherein the extending and applying steps occur prior to the releasing step.

13. The method of claim 12, further comprising retracting the suction cup away from the object after the releasing step and prior to the rotating step.

14. The method of claim 13, further comprising:
    re-extending the suction cup toward the object; and
    reapplying another suction force to the object, after the rotating step, to re-secure the object.

15. The method of claim 14, further comprising depositing the object into an order container.

16. The method of claim 10, wherein the securing step includes determining at least part of a shape of the object from feedback received from the rollers.

17. A robot, comprising:
- a robot arm; and
- an end effector secured to the robot arm, the end effector comprising;
  - a body;
  - a suction cup movable relative to the body between a retracted position and an extended position;
  - a plurality of fingers spaced around the suction cup, each of the fingers being actuatable between an open condition and a clamped condition; and
  - a roller coupled to each one of the plurality of fingers and arranged to rotate about first and second axes.

18. The robot of claim 17, further comprising a substantially u-shaped bracket coupling each roller to a respective finger, wherein each one of the rollers is rotatable within and relative to the bracket about the first axis.

19. The robot of claim 18, wherein each u-shaped bracket is rotatable relative to the respective finger about the second axis.

20. A picking station comprising a pedestal to which the robot of claim 17 is mounted.

* * * * *